(12) United States Patent
Fortunato (10) Patent No.: US 11,568,897 B1
(45) Date of Patent: Jan. 31, 2023

(54) INTERFACE FOR CHANGING A MEDIA SEQUENCE

(71) Applicant: GOPRO, INC., San Mateo, CA (US)

(72) Inventor: Steven Fortunato, Solana Beach, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/344,849

(22) Filed: Jun. 10, 2021

(51) Int. Cl.
*G11B 27/036* (2006.01)
*G06F 3/0482* (2013.01)
*G06F 3/0486* (2013.01)

(52) U.S. Cl.
CPC .......... *G11B 27/036* (2013.01); *G06F 3/0482* (2013.01); *G06F 3/0486* (2013.01)

(58) Field of Classification Search
CPC ..... G11B 27/036; G11B 27/02; G11B 27/022; G11B 27/024; G11B 27/026; G11B 27/028; G11B 27/029; G11B 27/031; G11B 27/032; G11B 27/034; G11B 27/06; G06F 3/0482; G06F 3/0486
See application file for complete search history.

(56) References Cited

U.S. PATENT DOCUMENTS

| | | | | |
|---|---|---|---|---|
| 5,237,648 A * | 8/1993 | Mills | .................... | G11B 27/034 715/974 |
| 6,137,945 A * | 10/2000 | McGrath | ................ | G11B 27/36 386/230 |
| 6,400,378 B1 * | 6/2002 | Snook | .................... | G11B 27/34 715/204 |
| 6,539,163 B1 * | 3/2003 | Sheasby | ............... | G11B 27/034 348/278 |
| 9,940,971 B2 * | 4/2018 | Gilley | .................... | H04N 5/272 |
| 10,887,542 B1 * | 1/2021 | Brandt | ........... | H04N 21/440245 |
| 2004/0226012 A1 * | 11/2004 | Awada | ................ | G06F 3/04855 715/201 |
| 2008/0244410 A1 * | 10/2008 | Schormann | ......... | G06F 3/04886 715/723 |
| 2012/0210222 A1 * | 8/2012 | Matsuda | ............. | G06F 3/04847 715/716 |
| 2012/0213495 A1 * | 8/2012 | Hafeneger | ........... | G11B 27/034 386/E5.028 |
| 2014/0033041 A1 * | 1/2014 | Lyons | .................. | G06Q 10/103 715/723 |

* cited by examiner

*Primary Examiner* — Kieu D Vu
*Assistant Examiner* — Blaine T Basom
(74) *Attorney, Agent, or Firm* — Esplin & Associates, PC (57) ABSTRACT

A sequence of media items may be presents. Based on selection of media items for potential inclusion into the sequence of media items, the selected media items may be presented apart from the sequence of media items. One or more of the selected media items may be inserted into a location in the sequence of media items.

20 Claims, 8 Drawing Sheets

INTERFACE FOR CHANGING A MEDIA SEQUENCE

FIELD

This disclosure relates to an interface for changing a media sequence.

BACKGROUND

A user may wish to add new media items into a media sequence, such as a video edit. The user may wish to have precise control over where the new media items are placed in the media sequence.

SUMMARY

This disclosure relates to an interface for changing a media sequence. A media sequence element may be presented. The media sequence element may provide a graphical representation of a sequence of media items. The sequence of media items may include media items ordered in a sequence. The media sequence element may include media elements that graphically represent the media items. The media elements may be arranged in the media sequence element based on ordering of the media items in the sequence of media items. A selection of a set of media items for potential inclusion into the sequence of media items may be obtained. The set of media items may include one or more selected media items. An insertion set element may be presented. The insertion set element may provide a graphical representation of the set of media items selected for potential inclusion into the sequence of media items. The insertion set element may include one or more selected media elements that graphically represent the selected media item(s). A selection of a location in the sequence of media items into which at least one of the selected media item(s) are to be inserted may be obtained. The at least one of the selected media item(s) may be inserted into the location in the sequence of media items.

A system that presents an interface for changing a media sequence may include one or more electronic storage, processor, and/or other components. The electronic storage may store information relating to a sequence of media items, information relating to media items, information relating to a media sequence element, information relating to a set of media items, information relating to an insertion set element, information relating to a selection of a location in a sequence of media items, information relating to insertion of a selected media item into a location in a sequence of media items, and/or other information.

The processor(s) may be configured by machine-readable instructions. Executing the machine-readable instructions may cause the processor(s) to facilitate presenting an interface for changing a media sequence. The machine-readable instructions may include one or more computer program components. The computer program components may include one or more of a media sequence component, a media item component, an insertion set component, a location component, an insertion component, and/or other computer program components.

The media sequence component may be configured to present a media sequence element and/or other elements. The media sequence element may provide a graphical representation of a sequence of media items. The sequence of media items may include media items ordered in a sequence. The media sequence element may include media elements that graphically represent the media items. The media elements may be arranged in the media sequence element based on ordering of the media items in the sequence of media items. In some implementations, the media elements may include thumbnail tiles of the media items.

In some implementations, the sequence of media items may include one or more images, one or more videos, and/or other media items.

The media item component may be configured to obtain a selection of a set of media items for potential inclusion into the sequence of media items. The set of media items may include one or more selected media items.

The insertion set component may be configured to present an insertion set element and/or other elements. The insertion set element may provide a graphical representation of the set of media items selected for potential inclusion into the sequence of media items. The insertion set element may include one or more selected media elements that graphically represent the selected media item(s).

In some implementations, the insertion set element may be presented separate and apart from the media sequence element.

In some implementations, ordering of the selected media item(s) for insertion into a location in the sequence of media items may be changed via user interaction with the selected media element(s) to change ordering of the selected media element(s) in the insertion set element. In some implementations, initial ordering of the selected media element(s) in the insertion set element may be determined based on an order in which the selected media element(s) are selected for potential inclusion.

The location component may be configured to obtain a selection of a location in the sequence of media items into which at least one of the selected media item(s) are to be inserted. In some implementations, a location element may identify an insertion location in the media sequence element. The location mover element may enable changes in the insertion location identified by the location element. The selection of the location in the sequence of media items into which the at least one of the selected media item(s) are to be inserted may be obtained based on user interaction with the location mover element.

In some implementations, the location mover element may include a preceding location element to move the location element to a preceding location in the media sequence element and a following location element to move the location element to a following location in the media sequence element.

In some implementations, the selection of the location in the sequence of media items into which a given selected media items is to be inserted may be obtained based on drag and drop of a corresponding selected media element into a corresponding location in the media sequence element.

The insertion component may be configured to insert the at least one of the selected media item(s) into the location in the sequence of media items. In some implementations, all of the selected media item(s) may be inserted into the location in the sequence of media items.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
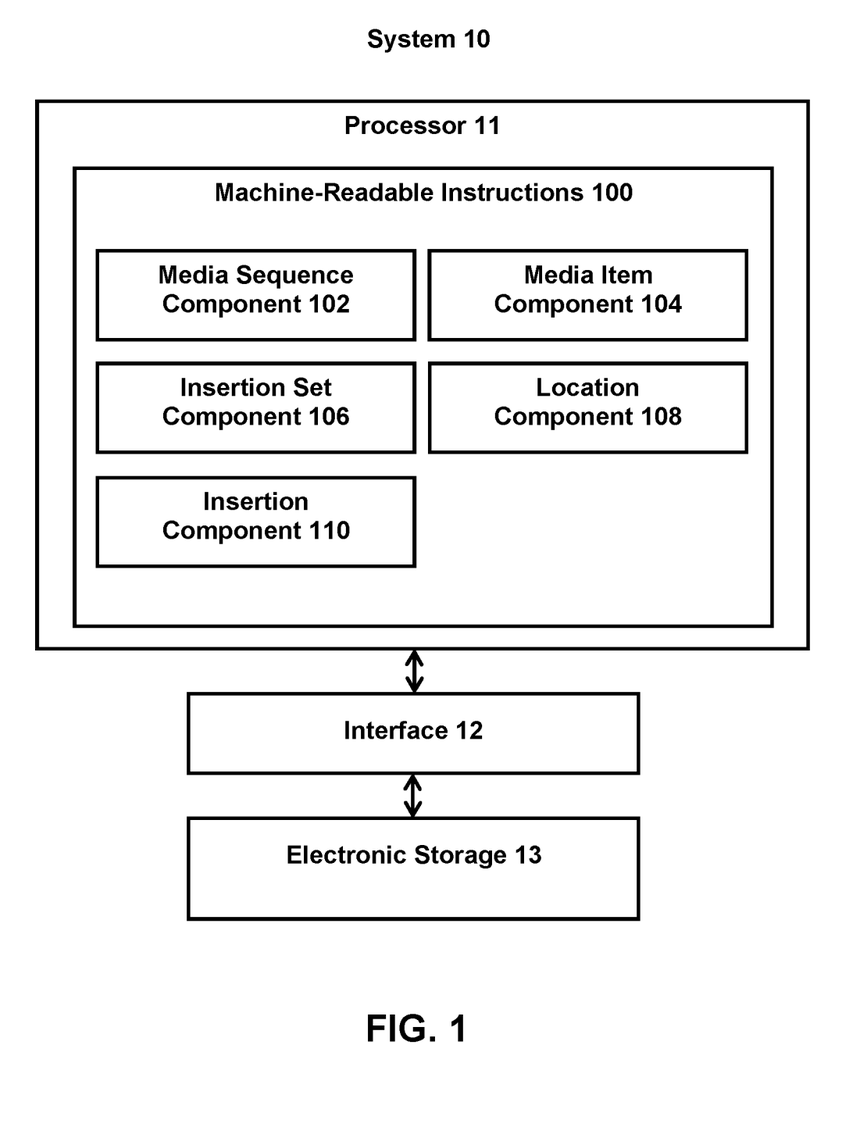
FIG. 1 illustrates a system that presents an interface for changing a media sequence.

FIG. 1 illustrates a system 10 that presents an interface for changing a media sequence. The system 10 may include one or more of a processor 11, an interface 12 (e.g., bus, wireless interface), an electronic storage 13, and/or other components. A media sequence element may be presented on one or more displays by the processor 11. The media sequence element may provide a graphical representation of a sequence of media items. The sequence of media items may include media items ordered in a sequence. The media sequence element may include media elements that graphically represent the media items. The media elements may be arranged in the media sequence element based on ordering of the media items in the sequence of media items. A selection of a set of media items for potential inclusion into the sequence of media items may be obtained by the processor 11. The set of media items may include one or more selected media items. An insertion set element may be presented on the display(s) by the processor 11. The insertion set element may provide a graphical representation of the set of media items selected for potential inclusion into the sequence of media items. The insertion set element may include one or more selected media elements that graphically represent the selected media item(s). A selection of a location in the sequence of media items into which at least one of the selected media item(s) are to be inserted may be obtained by the processor 11. The at least one of the selected media item(s) may be inserted into the location in the sequence of media items by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to a sequence of media items, information relating to media items, information relating to a media sequence element, information relating to a set of media items, information relating to an insertion set element, information relating to a selection of a location in a sequence of media items, information relating to insertion of a selected media item into a location in a sequence of media items, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for changing a media sequence. The machine-readable instructions 100 may include one or more computer program components. The machine-readable instructions 100 may include one or more of a media sequence component 102, a media item component 104, an insertion set component 106, a location component 108, an insertion component 110, and/or other computer program components.

The media sequence component 102 may be configured to present a media sequence element and/or other elements. The media sequence element may be presented on one or more displays. The media sequence element may be presented within one or more graphical user interfaces.

A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display. The interface elements may include one or more of a media sequence element, a media element, an insertion set element, a selected media element, and/or other interface elements.

A sequence of media items may refer to an arrangement of media items. A sequence of media items may refer to an ordering of media items. A sequence of media items may refer to a particular order in which media items are arranged/follow each other. A sequence of media items may include media items ordered in a sequence. A sequence of media items may include (define) a sequence (a particular arrangement/order) of media items. A sequence of media items may provide a view of the media items included in the sequence. For example, a sequence of media items may refer to an arrangement/order of media items in a media summary. For example, a sequence of media items may be generated to include a particular arrangement of one or more images, one or more videos, and/or other media items for playback. For example, a sequence of media items may refer to a video edit that include one or more images, one or more videos, and/or other media items arranged in a particular sequence. A media item may refer to an item that may be visually and/or audibly consumed. A media item may refer to a multimedia item. For example, a media item may include an image, a video, a sound clip, and/or other media item.

A media sequence element may refer to an interface element that visually represents media items in a sequence of media items. A media sequence element may visually represent a sequence of media items. A media sequence element may provide a graphical representation of a sequence of media items. A media sequence element may provide a graphical representation of a sequence of media items by including media elements for individual media items in the sequence of media items. That is, a media sequence element may include media elements that graphically represent the media items in the sequence of media items. The media elements may be arranged in the media sequence element based on ordering of the media items in the sequence of media items. The ordering of the media elements in the media sequence element may match/be the same as the ordering of media items in the sequence of media items.

In some implementations, the media elements may represent content of the media items. For example, the visual appearance of the media elements the may be generated from the visual content of the corresponding media items. For example, the media elements may include thumbnail tiles of the media items. A thumbnail tile may of a media item may refer to a tile-shaped (e.g., square shape, rectangular shape, circle shape) element that includes a thumbnail image of the media item. A thumbnail tile may of a media item may refer to a visual representation of the media item that may be arranged like a tile for display. A tile-shaped element may have one or more sharp corners, one or more rounded corners, and/or other corners.

FIGS. 3A, 3B, 3C, 3D, 3E, and 3F illustrate an example graphical user interface 300 for changing a media sequence. The views of the graphical user interface 300 in FIGS. 3A, 3B, 3C, 3D, 3E, and 3F are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, 3C, 3D, 3E, and 3F.

Figure 3A:
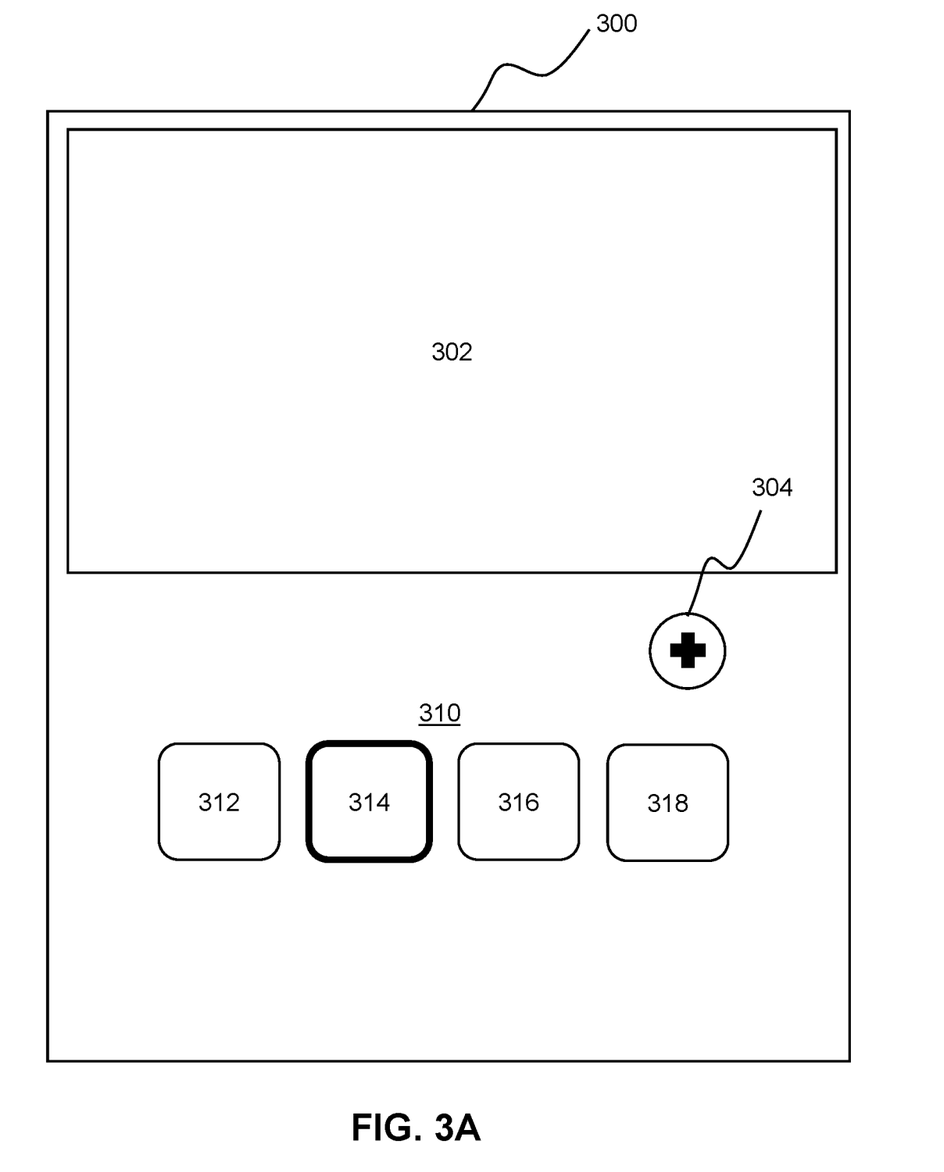
FIG. 3A illustrates an example graphical user interface for changing a media sequence.

Referring to FIG. 3A, the graphical user interface 300 may include a visual content playback portion 302. The visual content playback portion 302 may include presentation of visual content (visual content of image(s), video(s), video edit(s)). The graphical user interface 300 may include a media sequence element 310. The media sequence element 310 may provide a graphical representation of a sequence of media items. In FIG. 3A, the media sequence element 310 may provide a graphical representation of a sequence of media items that includes four media items. The media sequence element 310 may include media elements 312, 314, 316, 318 that graphically represent the media items in the sequence of media items. The media elements 312, 314, 316, 318 that may be arranged in the media sequence element 310 based on ordering of the media items in the sequence of media items.

The graphical user interface 300 may include one or more interface elements that enable a user to change media items included in the sequence of media items. The graphical user interface 300 may include interface element(s) that enable a user to add one or more media items to the sequence of media time, remove one or more media items from the sequence of media items, change ordering of media items in the sequence of media items, and/or otherwise change the media items included in the sequence of media items. For example, in FIG. 3A, the graphical user interface 300 may include an add element 304. User interaction with the add element 304 may cause the system 10 to present one or more options to add media items to the sequence of media items. In some implementations, user interaction with the add element 304 may cause the system 10 to present additional options for adding media items to the sequence of media items. For example, user interaction with the with the add element 304 may cause the system 10 to present an option for the user to choose to add a media item or to add a text card/title screen to the sequence of media items.

Figure 3B:
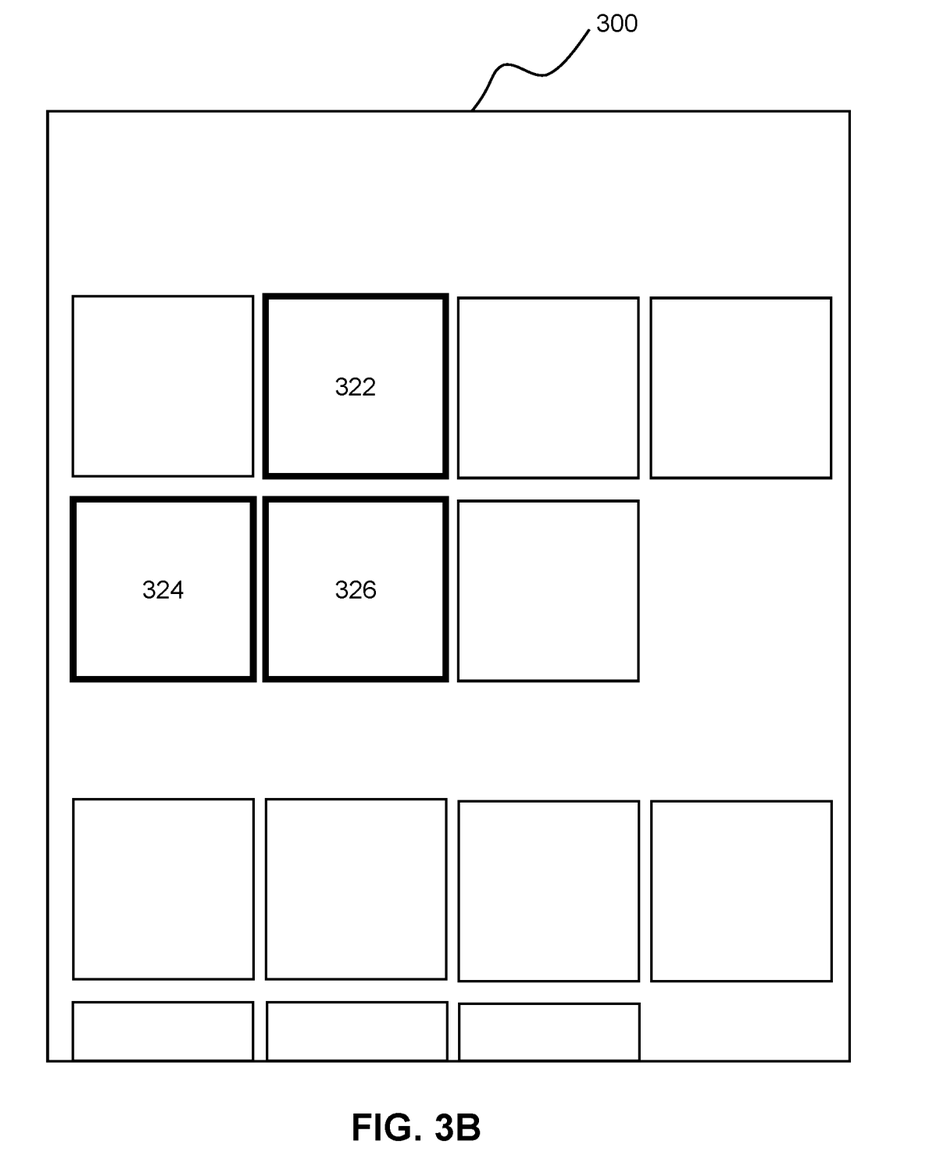
FIG. 3B illustrates an example graphical user interface for changing a media sequence.

In some implementations, the graphical user interface 300 may change to provide view of media items that may be added to the sequence of media items. For example, FIG. 3B illustrates an example view of the graphical user interface 300 for user selection of media items. The view of the graphical user interface 300 in FIG. 3B may be presented after user interaction with the add element 304 in FIG. 3A. In FIG. 3B, the graphical user interface 300 may include media elements for individual media items that are available to be added to the sequence of media items. In some implementations, the media elements may be grouped based on one or more characteristics of the media items. For example, the media times may be grouped based on capture location, capture time, content categorization, and/or other characteristics of the media items. In some implementations, the graphical user interface 300 may enable separate viewing of media items in different locations (e.g., separate tabs for media items inside an App, stored on a mobile device, stored in the Cloud, etc.). A user may interact with the media elements to provide selection of one or more media items to be potentially added to the sequence of media items. For example, in FIG. 3B, a user may have selected media elements 322, 324, 326.

The media item component 104 may be configured to obtain a selection of a set of media items for potential inclusion into the sequence of media items. A set of media items that have been selected for potential inclusion into the sequence of media items may include one or more selected media items. Obtaining a selection of a set of media items for potential inclusion into the sequence of media items may include ascertaining, determining, establishing, identifying, receiving, and/or otherwise obtaining the selection of the set of media items. The set of media items may be selected for potential inclusion into the sequence of media items based on user selection, analysis of the media items, and/or other information. User selection may refer to user input that identifies media items to be potentially included in the sequence of media items. For example, a user may have interacted with the user interface 300 shown in FIG. 3B to provide selection of media items to be added to the sequence of media items. Analysis of the media items may refer to examination, evaluation, processing, studying, and/or other analysis of one or more features/characteristics of the media items. For example, one or more media items may be automatically selected based on feature(s)/characteristic(s) of the media items.

The insertion set component 106 may be configured to present an insertion set element and/or other elements. The insertion set element may be presented on one or more displays. The insertion set element may be presented within one or more graphical user interfaces.

An insertion set element may refer to an interface element that visually represents media items that have been selected for potential inclusion into the sequence of media items. An insertion set element may visually represent a set of media items that have been selected for potential inclusion into the sequence of media items. An insertion set element may provide a graphical representation of the set of media items that have been selected for potential inclusion into the sequence of media items. An insertion set element may provide a graphical representation of the set of media items that have been selected for potential inclusion into the sequence of media items by including selected media elements for individual selected media items. That is, an insertion set element may include selected media element(s) that graphically represent the selected media item(s). In some implementations, the insertion set element may be presented separate and apart from the media sequence element.

The selected media elements may be arranged in the insertion set element base on one or more characteristics of the selected media items. For example, the selected media elements may be initially ordered in the insertion set element based on name, capture location, capture time, content categorization, and/or other information. In some implementations, the initial ordering of the selected media elements in the insertion set element may be determined based on an order in which the selected media elements are selected for potential inclusion into the sequence of media items. For example, the initial ordering of the selected media elements in the insertion set element may follow/match the order in which the media items were selected by the user (e.g., such as through interaction with the graphical user interface in FIG. 3B).

In some implementations, the ordering of the selected media elements in the insertion set element may be the order in which the selected media items are inserted into a location in the sequence of media items. In some implementations, the ordering of the selected media items for insertion into a location in the sequence of media items may be changed via user interaction with the selected media elements to change ordering of the selected media elements in the insertion set element. That is, a user may interact with the selected media elements to change the order of the selected media elements in the insertion set element. This may change the ordering in which the selected media elements are inserted into a location in the sequence of media items.

The insertion set element may provide an intermediate/stage area from which final decisions may be made for adding media items into the sequence of media items. That is, rather than simply inserting the selected media items into the sequence of media items upon user selection of the media items, the media items that have been selected may be presented (e.g., separate from the sequence of media items) to enable a user to confirm/decide which of the selected media items will be inserted in the sequence of media items, the order in which the selected media items will be inserted in the sequence of media items, and the location in which the selected media will be inserted in the sequence of media items.

Figure 3C:
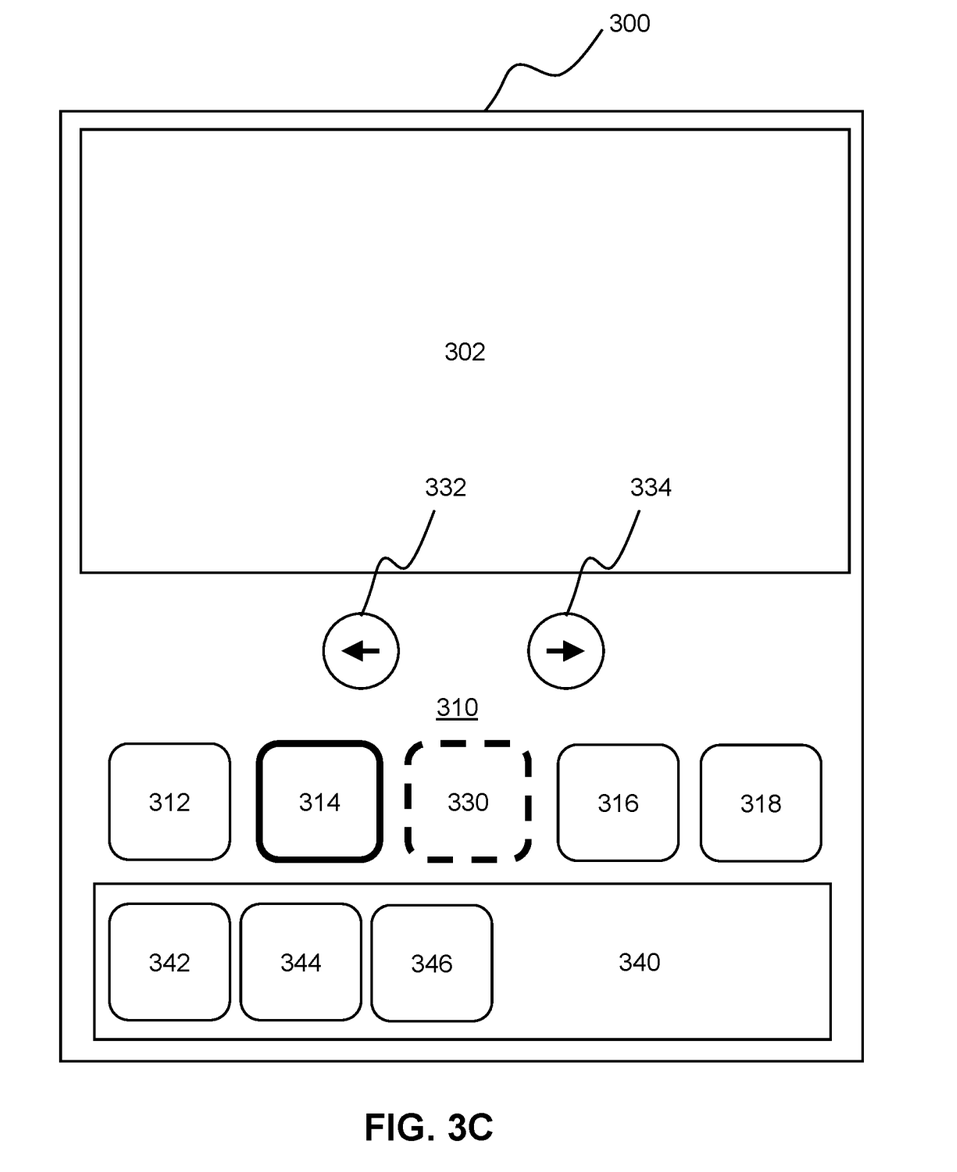
FIG. 3C illustrates an example graphical user interface for changing a media sequence.

Referring to FIG. 3C, the graphical user interface 300 may include an insertion set element 340. The insertion set element 340 may be separate and apart from the media sequence element 310. The insertion set element 340 may provide a graphical representation of the set of media items selected for potential inclusion into the sequence of media items (represented by the media sequence element 310). The insertion set element 340 may include selected media elements 342, 344, 346 that graphically represent the selected media items. In some implementations, the ordering of the selected media elements 342, 344, 346 in the insertion set element 340 may represent the order in which the selected media items are inserted into a location in the sequence of media items. A user may interact with the selected media elements 342, 344, 346 to change the ordering of the selected media elements 342, 344, 346 in the insertion set element 340.

The graphical user interface may include a location element 330 to represent a location in the sequence of media items. The location element 330 may identify an insertion location in the media sequence element. The location represented by the location element 330 may be the location into which the selected media items are to be inserted. In some implementations, the location element 330 may initially be positioned at the beginning, middle, or end of the media sequence element 310. In some implementations, the location element 330 may initially be positioned adjacent to a media element that was selected by a user prior to the user initiating a process for adding media item(s) to the sequence of media items. For example, a user may have selected the media element 314 prior to interaction with the add element 304 (shown in FIG. 304. User selection of the media element 314 may be indicated by one or more visual changes to the media element 314 (e.g., the media element 314 being highlighted, media element 314 being surrounded by thicker border, etc.). Based on the user having selected the media element 314 prior to initiating the process for adding media item(s) to the sequence of media items, the location element 330 may be positioned adjacent to (e.g., after, before) the media element 314.

The graphical user interface 300 may include one or more interface elements to enable a user to select/change a location in the sequence of media items into which the selected media elements may be inserted. Such interface element(s)

may be referred to as location mover element(s). A location mover element may enable changes in the insertion location identified by the location element 330. In some implementations, a location mover element may include a preceding location element and a following location element. User interaction with the preceding location element may move the location element to a preceding location in the media sequence element. User interaction with the following location element may move the location element to a following location in the media sequence element.

Figure 3D:
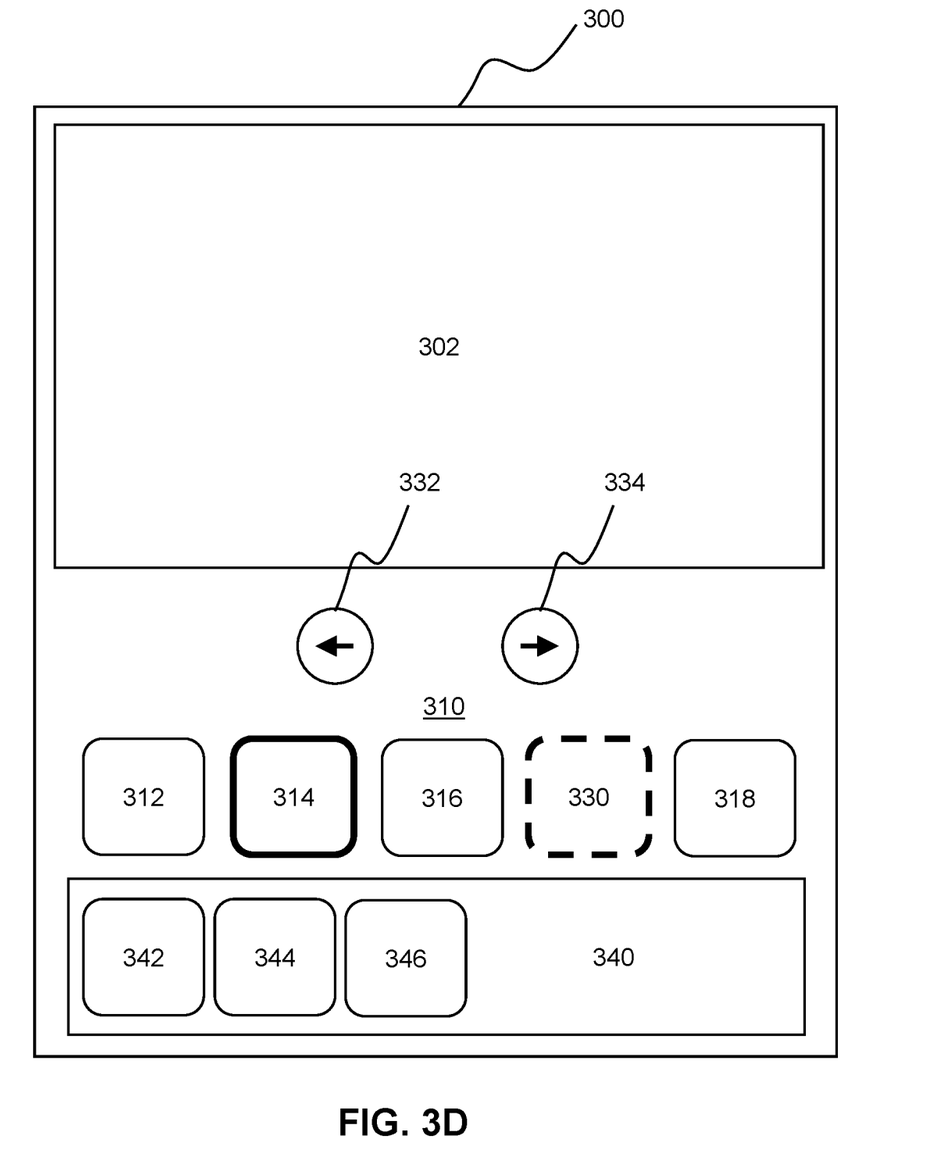
FIG. 3D illustrates an example graphical user interface for changing a media sequence.

For example, in FIG. 3C, the graphical user interface may include a preceding location element 332 and a following location element 334. User interaction with the preceding location element 332 may cause the location element 330 to move to a preceding location (e.g., move to the left) in the media sequence element 310. User interaction with the following location element 334 may cause the location element 330 to move to a following location (e.g., move to the right) in the media sequence element 310. For example, a user may click on the following location element 334 once to move the location element 330 to be positioned between the media element 316 and the media element 318, as shown in FIG. 3D.

The location component 108 may be configured to obtain a selection of a location in the sequence of media items into which at least one of the selected media item(s) are to be inserted. The location component 108 may be configured to obtain a selection of a location in the sequence of media items into which one or more of the selected media items(s) graphically represented in the insertion set element are to be inserted. Obtaining a selection of a location in the sequence of media items into which the selected media item(s) are to be inserted may include ascertaining, determining, establishing, identifying, receiving, and/or otherwise obtaining the selection of the location. The location in the sequence of media items into which the selected media item(s) are to be inserted may be referred to as insertion location.

In some implementations, the selection of the insertion location may be obtained based on one or more defaults. For example, the system 10 may include a default position into which the selected media item(s) are to be inserted. For example, the system 10 may, by default, insert the selected media item(s) at the beginning, the middle, or the end of the sequence of media items. Other default insert locations are contemplated.

In some implementations, the selection of the insertion location may be obtained based on user selection. For example, the selection of the insertion location may be obtained based on user interaction with one or more location mover elements, such as the preceding location element 332 and the following location element 334 shown in FIGS. 3C and 3D. User interaction with a location mover elements to select the insertion location may result in one insertion location being selected for all of the selected media items. As another example, the selection of the insertion location may be obtained based on user interaction with the selected media element(s). For instance, an insertion location for one or more of the selected media elements may be obtained based on drag and drop, by a user, of one or more corresponding selected media elements into a corresponding location in the media sequence element. For example, referring to FIG. 3C, a user may select one or more of the selected media elements 342, 344, 346, and then drag and drop the selected media item(s) into a particular location in the media sequence element 310 to set the insertion located for the selected media element(s).

The insertion component 110 may be configured to insert the at least one of the selected media item(s) into the location in the sequence of media items. The insertion component 110 may be configured to insert one or more of the selected media item(s) into the location in the sequence of media items. The selected media item(s) may be inserted into the sequence of media items at the location obtained by the location component 108. In some implementations, all of the selected media item(s) may be inserted into the location in the sequence of media items. That is, all of the media item(s) that were selected for potential inclusion into the sequence of media items may be inserted into the location in the sequence of media items. The selected media item(s) may be ordered in the location based on how the selected media element(s) were ordered in the insertion set element. In some implementations, individual selected media items/individual groupings of selected media items may be inserted at location set for the media items/groupings of media items (e.g., based on drag and drop operation). Insertion of the selected media item(s) into the location may modify the sequence of media items. The media sequence element may be modified/updated to show the changes in the sequence of media items.

Figure 3E:
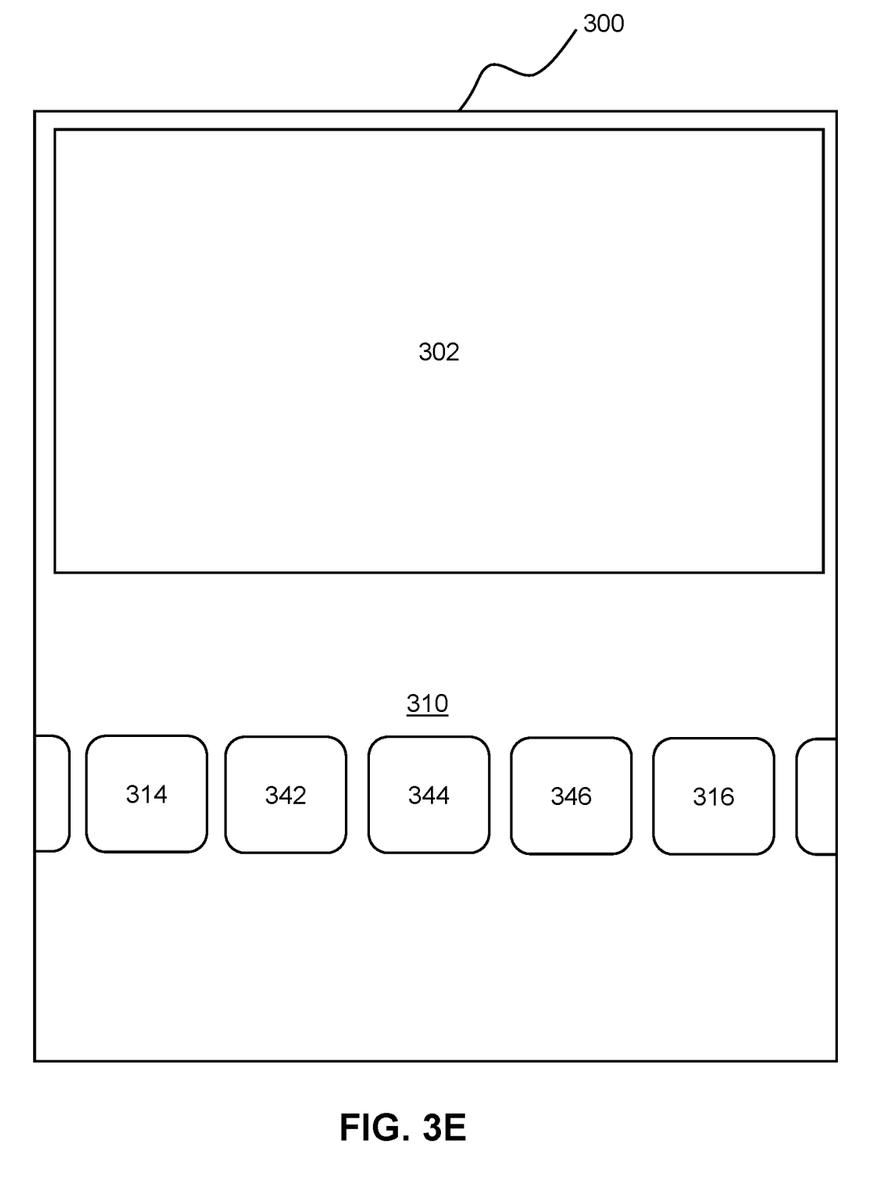
FIG. 3E illustrates an example graphical user interface for changing a media sequence.

For example, based on the insertion location being positioned between the media element 314 and the media element 316 (as shown in FIG. 3C), the media sequence may be modified as shown in FIG. 3E. As shown in FIG. 3E, the selected media elements 342, 344, 346 may be inserted between the media element 314 and the media element 316.

Figure 3F:
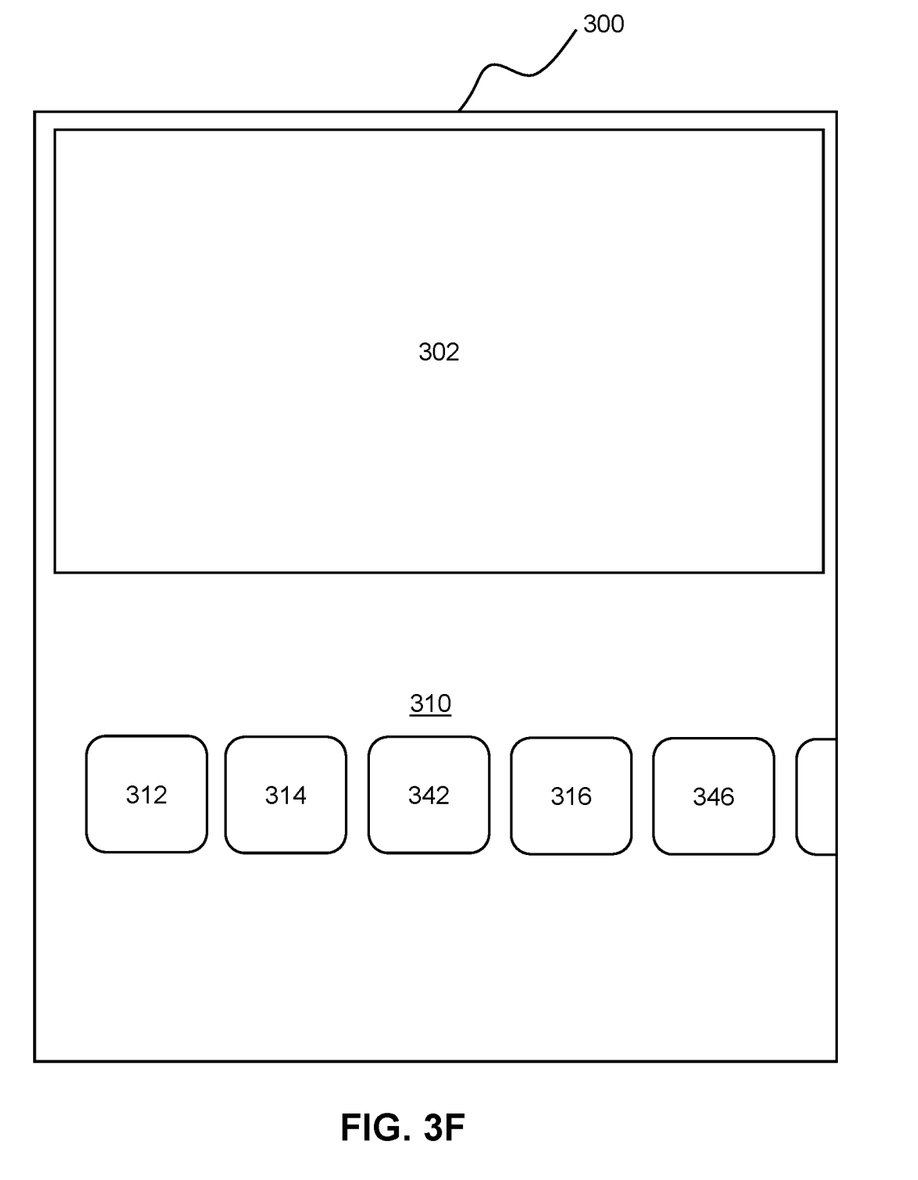
FIG. 3F illustrates an example graphical user interface for changing a media sequence.

As another example, a user may have dragged and dropped the selected media element 342 to a location between the media element 314 and the media element 316. The user may have dragged and dropped the selected media element 346 to a location between the media element 316 and the media element 318. Based on the drag-and-drop of the individual selected media elements, the media sequence may be modified as shown in FIG. 3F. As shown in FIG. 3F, the selected media element 534 may be inserted between the media elements 314 and the media element 316, and the selected media element 536 may be inserted after the media element 316.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
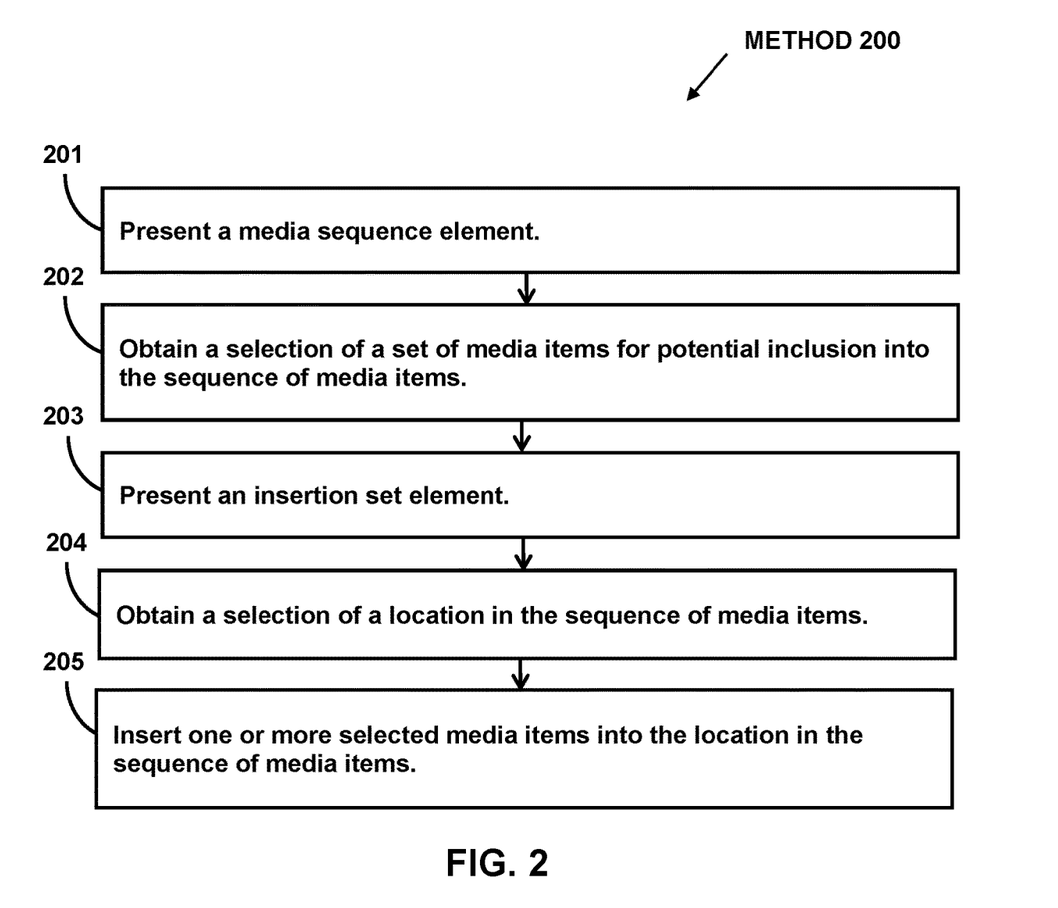
FIG. 2 illustrates a method for presenting an interface for changing a media sequence.

FIG. 2 illustrates method 200 for presenting an interface for indicating video editing decisions. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a media sequence element may be presented. The media sequence element may provide a graphical representation of a sequence of media items. The sequence of media items may include media items ordered in a sequence. The media sequence element may include media elements that graphically represent the media items. The media elements may be arranged in the media sequence element based on ordering of the media items in the sequence of media items. In some implementations, operation 201 may be performed by a processor component the same as or similar to the media sequence component 102 (Shown in FIG. 1 and described herein).

At operation 202, a selection of a set of media items for potential inclusion into the sequence of media items may be obtained. The set of media items may include one or more selected media items. In some implementations, operation 202 may be performed by a processor component the same as or similar to the media item component 104 (Shown in FIG. 1 and described herein).

At operation 203, an insertion set element may be presented. The insertion set element may provide a graphical representation of the set of media items selected for potential inclusion into the sequence of media items. The insertion set element may include one or more selected media elements that graphically represent the selected media item(s). In some implementations, operation 203 may be performed by a processor component the same as or similar to the insertion set component 106 (Shown in FIG. 1 and described herein).

At operation 204, a selection of a location in the sequence of media items into which one or more selected media items are to be inserted may be obtained. In some implementations, operation 204 may be performed by a processor component the same as or similar to the location component 108 (Shown in FIG. 1 and described herein).

At operation 205, one or more selected media items may be inserted into the location in the sequence of media items. In some implementations, operation 205 may be performed by a processor component the same as or similar to the insertion component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting an interface for changing a media sequence, the system comprising:
   one or more physical processors configured by machine-readable instructions to:
      present a first view of media items, the first view of media items including a media sequence element and an add element, the media sequence element providing a graphical representation of a sequence of media items, the sequence of media items including media items ordered in a sequence, the media sequence element including media icons that graphically represent the media items, the media icons arranged in the media sequence element based on ordering of the media items in the sequence of media items, the add element enabling a user to add other media items to the sequence of media items;
      responsive to user interaction with the add element, present a second view of media items, the second view of media items including media elements for individual media items available to be added to the sequence of media items;
      obtain a selection of a set of media items for potential inclusion into the sequence of media items based on user selection of the set of media items from the second view of media items, the set of media items including one or more selected media items;
      before modification of the sequence of media items, present a third view of media items, the third view of media items including an insertion set element and the media sequence element, the insertion set element providing a graphical representation of the set of media items selected for potential inclusion into the sequence of media items based on the user selection of the set of media items from the second view of media items, the insertion set element including one or more selected media icons that graphically represent the one or more selected media items, the insertion set element providing an intermediate or a stage area from which the user confirms identity and/or ordering of the set of media items to be inserted into the sequence of media items, the third view of media items further including:
         a location indicator among the media icons arranged in the media sequence element to identify a location in the sequence of media items into which at least one of the one or more selected media items is to be inserted; and
         a preceding location button and a following location button, wherein the location in the sequence of media items into which the at least one of the one or more selected media items is to be inserted is changed based on user interaction with the preceding location button and/or the following location button; and
      insert the at least one of the one or more selected media items into the location in the sequence of media items identified by the location indicator.

2. The system of claim 1, wherein the user interaction with the preceding location button moves the location indicator to be located between a preceding pair of the media icons arranged in the media sequence element and the user interaction with the following location button moves the location indictor indicator to be located between a following pair of the media icons arranged in the media sequence element.

3. The system of claim 1, wherein the location in the sequence of media items into which a given selected media item is to be inserted is selected based on drag and drop of a corresponding selected media icon into a corresponding location in the media sequence element.

4. The system of claim 1, wherein all of the one or more selected media items graphically represented by the one or more selected media icons in the insertion set element are inserted into the location in the sequence of media items identified by the location indicator.

5. The system of claim 1, wherein the ordering of the set of media items to be inserted into the sequence of media items is changed via user interaction with the one or more selected media icons in the insertion set element to change ordering of the one or more selected media icons in the insertion set element.

6. The system of claim 5, wherein initial ordering of the one or more selected media icons in the insertion set element is determined based on an order in which the one or more selected media items are selected for potential inclusion through user interaction with the media elements in the second view of media items.

7. The system of claim 1, wherein the media icons include thumbnail tiles of the media items.

8. The system of claim 1, wherein the insertion set element is positioned below the media sequence element in the third view of media items.

9. The system of claim 1, wherein the first view of media items is modified into the third view of media items via removal of the add element and addition of the insertion set element, the location indicator, the preceding location button, and the following location button.

10. A method for presenting an interface for changing a media sequence, the method performed by a computing system including one or more processors, the method comprising:
   presenting, by the computing system, a first view of media items, the first view of media items including a media sequence element and an add element, the media sequence element providing a graphical representation of a sequence of media items, the sequence of media items including media items ordered in a sequence, the media sequence element including media icons that graphically represent the media items, the media icons arranged in the media sequence element based on ordering of the media items in the sequence of media items, the add element enabling a user to add other media items to the sequence of media items;

responsive to user interaction with the add element, presenting, by the computing system, a second view of media items, the second view of media items including media elements for individual media items available to be added to the sequence of media items;

obtaining, by the computing system, a selection of a set of media items for potential inclusion into the sequence of media items based on user selection of the set of media items from the second view of media items, the set of media items including one or more selected media items;

before modification of the sequence of media items, presenting, by the computing system, a third view of media items, the third view of media items including an insertion set element and the media sequence element, the insertion set element providing a graphical representation of the set of media items selected for potential inclusion into the sequence of media items based on the user selection of the set of media items from the second view of media items, the insertion set element including one or more selected media icons that graphically represent the one or more selected media items, the insertion set element providing an intermediate or a stage area from which the user confirms identity and/or ordering of the set of media items to be inserted into the sequence of media items, the third view of media items further including:

a location indicator among the media icons arranged in the media sequence element to identify a location in the sequence of media items into which at least one of the one or more selected media items is to be inserted; and a preceding location button and a following location button, wherein the location in the sequence of media items into which the at least one of the one or more selected media items is to be inserted is changed based on user interaction with the preceding location button and/or the following location button; and inserting, by the computing system, the at least one of the one or more selected media items into the location in the sequence of media items identified by the location indicator.

11. The method of claim 10, wherein the user interaction with the preceding location button moves the location indicator to be located between a preceding pair of the media icons arranged in the media sequence element and the user interaction with the following location button moves the location indicator to be located between a following pair of the media icons arranged in the media sequence element.

12. The method of claim 10, wherein the location in the sequence of media items into which a given selected media item is to be inserted is selected based on drag and drop of a corresponding selected media icon into a corresponding location in the media sequence element.

13. The method of claim 10, wherein all of the one or more selected media items graphically represented by the one or more selected media icons in the insertion set element are inserted into the location in the sequence of media items identified by the location indicator.

14. The method of claim 10, wherein the ordering of the set of media items to be inserted into the sequence of media items is changed via user interaction with the one or more selected media icons in the insertion set element to change ordering of the one or more selected media icons in the insertion set element.

15. The method of claim 14, wherein initial ordering of the one or more selected media icons in the insertion set element is determined based on an order in which the one or more selected media items are selected for potential inclusion through user interaction with the media elements in the second view of media items.

16. The method of claim 10, wherein the media icons include thumbnail tiles of the media items.

17. The method of claim 10, wherein the insertion set element is positioned below the media sequence element in the third view of media items.

18. The method of claim 10, wherein the first view of media items is modified into the third view of media items via removal of the add element and addition of the insertion set element, the location indicator, the preceding location button, and the following location button.

19. A system for presenting an interface for changing a media sequence, the system comprising:

one or more physical processors configured by machine-readable instructions to:

present a first view of media items, the first view of media items including a media sequence element and an add element, the media sequence element providing a graphical representation of a sequence of media items, the sequence of media items including media items ordered in a sequence, the media sequence element including media icons that graphically represent the media items, the media icons arranged in the media sequence element based on ordering of the media items in the sequence of media items, the add element enabling a user to add other media items to the sequence of media items;

responsive to user interaction with the add element, present a second view of media items, the second view of media items including media elements for individual media items available to be added to the sequence of media items;

obtain a selection of a set of media items for potential inclusion into the sequence of media items based on user selection of the set of media items from the second view of media items, the set of media items including one or more selected media items;

before modification of the sequence of media items, present a third view of media items, the third view of media items including an insertion set element and the media sequence element, the insertion set element providing a graphical representation of the set of media items selected for potential inclusion into the sequence of media items based on the user selection of the set of media items from the second view of media items, the insertion set element including one or more selected media icons that graphically represent the one or more selected media items, the insertion set element providing an intermediate or a stage area from which the user confirms identity and/or ordering of the set of media items to be inserted into the sequence of media items, wherein the ordering of the set of media items to be inserted into the sequence of media items is changed via user interaction with the one or more selected media icons in the insertion set element to change ordering of the one or more selected media icons in the insertion set element, the third view of media items further including:

a location indicator among the media icons arranged in the media sequence element to identify a location in the sequence of media items into which at least one of the one or more selected media items is to be inserted; and a preceding location button and a following location button, wherein the location in the sequence of media items into which the at least one of the one or more selected media items is to be inserted is changed based on user interaction with the preceding location button and/or the following location button, wherein the user interaction with the preceding location button moves the location indicator to be located between a preceding pair of the media icons arranged in the media sequence element and the user interaction with the following location button moves the location indicator to be located between a following pair of the media icons arranged in the media sequence element; and insert the at least one of the one or more selected media items into the location in the sequence of media items identified by the location indicator.

20. The system of claim 19, wherein the media icons include thumbnail tiles of the media items.

\* \* \* \* \*

UNITED STATES PATENT AND TRADEMARK OFFICE
CERTIFICATE OF CORRECTION

PATENT NO. : 11,568,897 B1
APPLICATION NO. : 17/344849
DATED : January 31, 2023
INVENTOR(S) : Steven Fortunato It is certified that error appears in the above-identified patent and that said Letters Patent is hereby corrected as shown below:

In the Claims

In Claim 2, Column 14, Line 23, delete "indictor", therefor.

Signed and Sealed this
Fifth Day of September, 2023

Katherine Kelly Vidal
*Director of the United States Patent and Trademark Office*